United States Patent
Gundeti et al.

(10) Patent No.: US 9,710,368 B1
(45) Date of Patent: Jul. 18, 2017

(54) INTER-PROCESS COMMUNICATION AUTOMATED TESTING FRAMEWORK

(71) Applicant: Amazon Technologies, Inc., Reno, NV (US)

(72) Inventors: Pavan Gundeti, Karimanagar (IN); Jesper Mikael Johansson, Redmond, WA (US); Daniel Wade Hitchcock, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/268,801

(22) Filed: May 2, 2014

(51) Int. Cl.
*G06F 11/36* (2006.01)

(52) U.S. Cl.
CPC ...... *G06F 11/3688* (2013.01); *G06F 11/3692* (2013.01)

(58) Field of Classification Search
CPC .......... G06F 11/3688; G06F 11/3692
See application file for complete search history.

(56) References Cited

U.S. PATENT DOCUMENTS

| 2004/0153774 A1* | 8/2004 | Gavish et al. ................ 714/25 |
| 2005/0060610 A1* | 3/2005 | Leary ............... G06F 11/3672 714/25 |
| 2005/0188262 A1* | 8/2005 | Rosenman et al. ........... 714/25 |
| 2010/0162275 A1* | 6/2010 | Bradley ............ G06F 9/45512 719/328 |
| 2014/0269386 A1* | 9/2014 | Chu ..................... H04L 41/145 370/252 |

* cited by examiner

*Primary Examiner* — Li B Zhen
*Assistant Examiner* — Amir Soltanzadeh
(74) *Attorney, Agent, or Firm* — Davis Wright Tremaine LLP

(57) ABSTRACT

Application developers may develop applications or portions of application that do not have a corresponding user interface. Testing non-user interface elements of an application may require application developers to develop corresponding user interface elements for all or a portion of the executable code included in the application. Developers may test non-user interface elements of an application or library by wrapping the executable code in a sample application managed by a test harness. The test harness may transmit test operations configured to test the non-user interface elements of the application to the sample application over an inter-process communication channel. The sample application may execute the test and return the results of the test to the test harness using inter-process communication methods.

20 Claims, 9 Drawing Sheets

INTER-PROCESS COMMUNICATION AUTOMATED TESTING FRAMEWORK

BACKGROUND

Software development, including mobile application development, has greatly increased in recent years. Organizations increasingly develop multiple applications in order to support a variety of different hardware platforms with different capabilities and features. Software libraries may be developed and used across multiple applications in order to generate efficiency. These software libraries and applications may have user interface (UI) elements as well as non-user interface (non-UI) elements. Furthermore, the organizations developing the software libraries and applications may develop testing frameworks in order to facilitate automated testing of the software libraries and applications. In certain instances it may be difficult to test non-UI elements of software libraries or applications using existing testing frameworks. New applications including UI elements for various non-UI elements of a software library or application may need to be created in order to completely test the software libraries and applications.

BRIEF DESCRIPTION OF THE DRAWINGS

Various embodiments in accordance with the present disclosure will be described with reference to the drawings, in which.

DETAILED DESCRIPTION

Figure 1A:
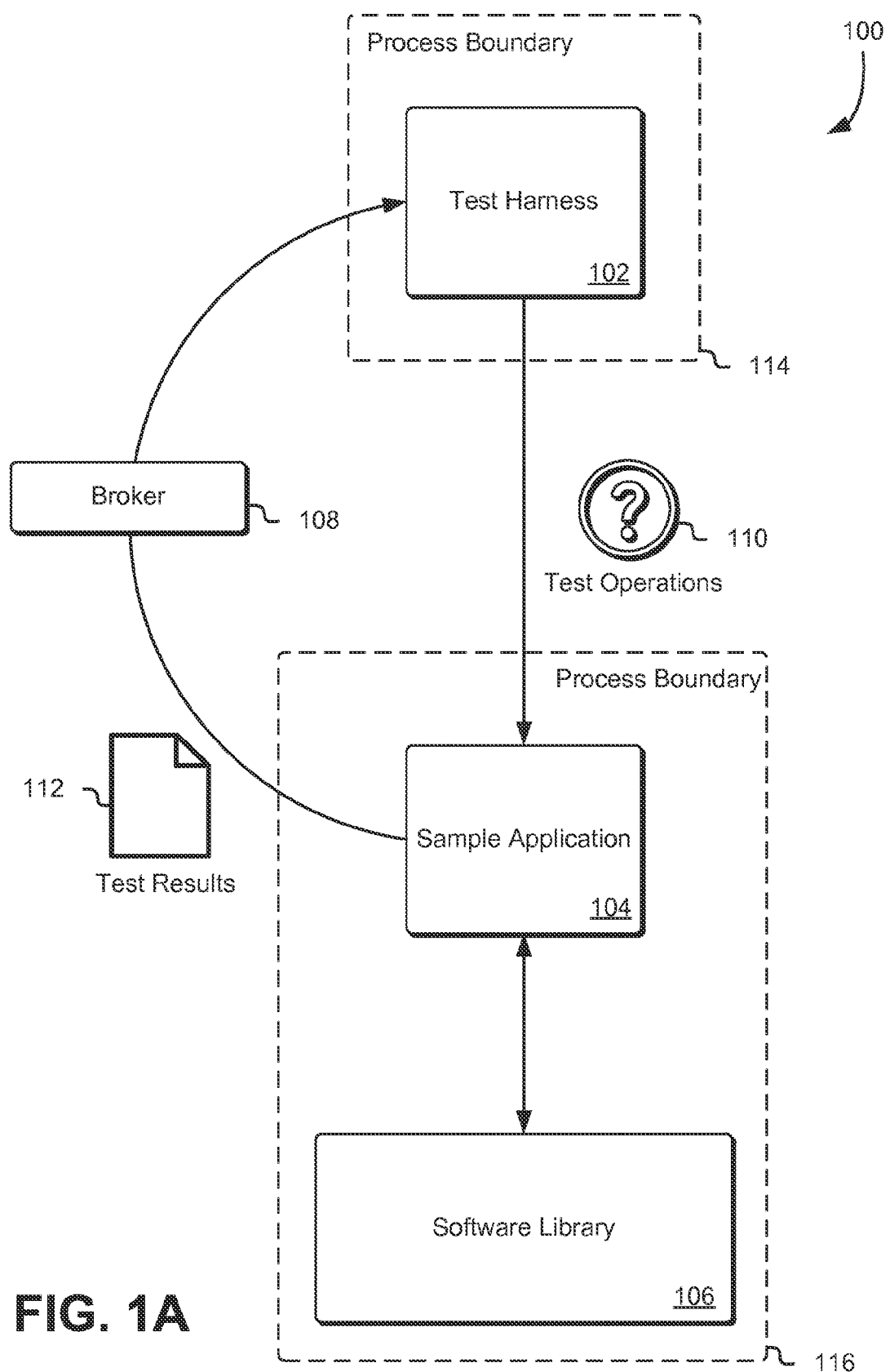
FIGS. 1A-1B shows an example of a testing framework for non-UI elements in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for software testing models involving non-UI elements. A test harness (also referred to as a test application) may be created in order to receive one or more test scripts, the one or more test scripts may specify library calls to be tested. For example, a user may generate a test script to test a particular application programming interface (API) call of a software library (also referred to as an application library), the particular API call may not have a corresponding UI element in the software library or any application utilizing the software library. In various embodiments, the test harness receives input directly from the user. The test harness may be configured to communicate with a sample application (also referred to as wrapper application) using inter-process communications, such as broadcast based communications methods. Example inter-process communications may be achieved such as by the test harness listening on a local only port, the test harness retrieving a file generated at least in part by the sample application from a file system or a broker application configured to enable communication between the test harness and the sample application.

For example, the test harness may register a broadcast intent with the sample application. The registered intent may be a passive data structure containing an abstract description of the test action or other actions to be performed. Along with registering the broadcast intent, the test harness may define a time-out period indicating how long the test harness will wait for a response to the registered broadcast intent. After registering the broadcast intent, the test harness may transmit library calls included in the test script to the sample application for execution though an inter-process communication method. The library calls may be configured such that transmitting the library calls to the sample application causes the sample application to execute the library calls. For example, the test harness may cause an activity (also referred to as a process or a thread) of the sample application to be launched, the activity may receive the library call from the test harness upon instantiation. The sample application may execute the activity and tie the executed activity with the registered intent. For example, the sample application may update the intent data structure with information corresponding to the activity.

The activity of the sample application may make the library calls indicated by the test harness. The software library may cause one or more operations to be performed and the results may be returned to the activity of the sample application. For example, the activity may call an authentication function of the software library, the authentication function of the software library may cause authentication information to be transmitted to a server over a network and may receive, in response to the authentication information, a token. The software library may then return information corresponding to the authentication function call to the activity of the sample application responsible for calling the function. Once the activity has received the information corresponding to the function call from the software library, the activity may transmit the result to the test harness using an inter-process communication channel. For example, the activity may broadcast the results to the test harness based at least in part in the information registered in the intent.

The test harness may receive the result from the sample application or the corresponding activity and validate the test results. For example, the test harness may determine if the test completed successfully and/or the correct function calls were executed by the sample application and the software library. The test harness may then generate a report based at least in part on the validated test results. The report may be generated such that the report is easily decipherable by a human operator. For example, the report may be formatted into several sections clearly defined by a section title, important information may be located near the top of the document, and various highlighting and fonts colors may be used or any other technique for making information easier for humans to read.

Figure 1B:
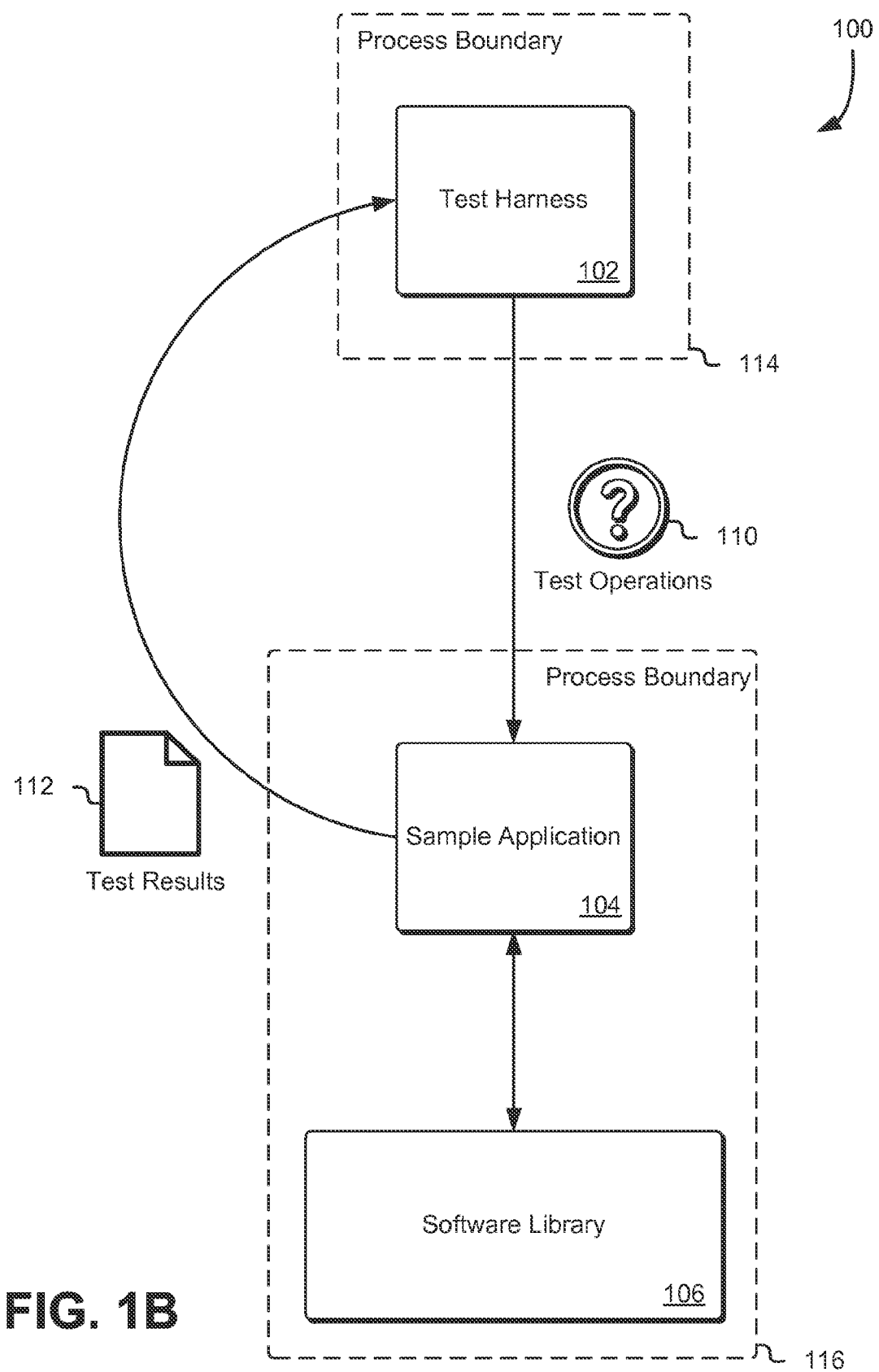

FIGS. 1A-1B illustrates an example environments 100A and 110B where one or more computer systems, as well as the associated code running thereon, may execute a test automation framework utilizing inter-process communications to communicate between various applications involved in the testing framework. A test harness 102 may be executed within a process boundary 114 (also referred to as a sandbox), the test harness 102 may be part of a testing framework configured to test non-UI elements of a software library or other software applications. The test harness 102 may cause the sample application 104 to execute test operations 110. The test harness 102 may be a collection of computing resources collectively configured to manage or otherwise control executing of software testing for any non-UI elements of a software application or software library. For example, the test harness 102 may be an application or associated code executing on a test system. The test harness 102 (also referred to as an automated test framework and test application) may be a collection of software and test data configured to test a software application, software library or software unit by running the software under varying conditions and monitoring behavior and outputs of the software.

The test harness 102 and sample application 104 may also include a computing system process, program, application, service, module or a combination of these and/or other such computing system entities. The test harness 102 and sample application 104 may be running directly on a computing system host, or may be running within a virtual machine (VM) on a computing system host or may be running on some other combination of physical and/or virtual computing systems. The test harness 102 and sample application 104 may operate as a distributed and/or cooperative process, program, application, service, module and/or combination of these and/or other such computing system entities within a distributed or non-distributed computing system environment. Elements of the test harness 102 and sample application may operate within a computing service resource provider (or remote) datacenter location, within a customer provided (or local) datacenter location, within a combination of local and remote datacenter locations or within a combination of these and/or other such datacenter locations.

The test harness 102 may include a test execution engine and the test script repository, not shown in FIGS. 1A-1B for simplicity. In various embodiments, the test system may be a user's computer system, the user may have agreed to allow the user's computer system to be used as a test system as part of a terms of service agreement or in order to receive a discount for service. Furthermore, the process boundary 114 and 116 (also referred to as an application sandbox or application sandboxing) may limit the environments in which certain executable code can execute. For example, the process boundary 114 may isolate an application in order to prevent outside malware, intruders, system resources or other applications from interacting with the isolated application.

Returning to FIG. 1A, the test harness 102 may be executed by a test system (also referred to as a testing device), the test system may be representative of a computer system a user may operate during execution of the software library under test. For example, the software library under test may be a software library for supporting mobile application, as a result, the test system may be a particular mobile platform the user is expected to operate when executing the mobile application. The test system is described in greater detail below in connection with FIG. 3. The test system may also execute the sample application 104. In various embodiments, the test harness 102 and the sample application 104 are executed in a distributed computing environment. In a distributed computing environment, the test harness 102 and the sample application 104 may be executed on distinct computer systems, and communications between the test harness 102 and the sample application 104 may be transmitted over a network. The test harness 102 may receive test operations 110 from a user or administrator of a software test. The test operation 110 may include library calls and parameters to include in the library calls. The library calls may include API calls, service calls, function calls, script calls or any other mechanism for invoking executable code. For example, the test operation 110 may indicate a login function call and a set of parameters corresponding to a username and password to be included in the login function call.

The test operation 110 may be transmitted to the sample application 104 by the test harness 102. The test harness 102 may include the test operations 110 in a call to the sample application 104. For example, the test harness 102 may execute one or more commands that cause an activity to be launched in the sample application 104. The one or more commands may take the test operations 110 as a parameter to the commands. Various other communication techniques may be used in order to communicate the test operations 110 to the sample application, including service calls, API calls, message passing, shared memory, remote procedure calls, local area network (e.g., direct packet exchange) or any other method suitable for transmitting information between applications. The testing device or software and associated code executing thereon may provide the test harness 102 and/or sample application 104 with the mechanism for communicating such as a broker 108. For example, the testing device may be an ANDRIOD® device configured to provide broadcast based inter-process communications as well as activity based communications to allow the test harness 102 to instantiate a process executed by the sample application 104, including information corresponding to the test operations 110. The inter-process communications may be achieved by the broker 108 application facilitating communication between the test harness 102 and the sample application 104. Furthermore, the test harness 102 and the sample application 104 may be configured to communicate directly.

The sample application 104 may make one or more software library 106 calls based at least in part on the test operations 110. As illustrated by FIG. 1A, the sample application 104 executes the software library 106 calls within the process boundary 116. The software library 106 may be included as part of the sample application 104 or may be a separate file or application referenced by the sample application 104. The sample application 104 may be a collection of computing resources collectively configured to execute one or more software tests for any non-UI elements of a software application or software library. For example, the sample application may be an application or associated code executing on the test system. The sample application 104 may be configured to execute one or more library calls sequentially or in parallel and obtain a result of the executed one or more library calls. The sample application 104 may then transmit the test results 112 to the test harness 102 using inter-process communication methods. Furthermore, the sample application 104 or process thereof may transmit the test results 112 to the broker 108, the broker 108 may then transmit the test results 112 to the test harness 102. In various embodiments, the test harness 102 is configured to listen to the broker 108 in order to determine if the sample application 104 has transmitted the test results 112 to the broker 108. The inter-process communication may be a mechanism provided by the test system or a portion thereof. For example, the inter-process communication may be a broadcast communication associated with a registered intent as described above. The sample application 104 may determine, based at least in part on the intent register, an application or location to transmit the test results 112 to.

For example, the test harness 102 may register an intent with the inter-process communication 108 method before transmitting the test operations 110 to the sample application 104. After executing the test operations 110, the sample application 104 may determine that the test harness had previously registered an intent associated with the transmitted test operations 110 and may transmit the test results 112 to the test operation 102 in response to the register intent. The sample application 104 may also be configured to transmit test results 112 to the test harness without a previously registered intent. As illustrated by FIG. 1B the sample application 104 may be configured to transmit the test results 112 directly to the test harness 102. For example, the test harness 102 may create a file and enable access to the file by the sample application 104. The sample application 104 may then record the test results 112 to the file. The file may be monitored by the test harness 102 and at some point after the sample application 104 records the test results 112 into the file, the test harness 102 may retrieve the test results from the file. The test harness 102 and sample application 104 may be configured to communicate directly using a variety of different techniques include inter-process communication, direct physical connection, network connection or other suitable communication connection with or without an intermediary. For example, the test harness 102 and the sample application may be directly connected with a universal serial bus (USB) cable or other direct cable connection. In another example, the test harness 102 and the sample application 104 may be configured to communicate by causing audio to be outputted and receiving the outputted audio.

Figure 2:
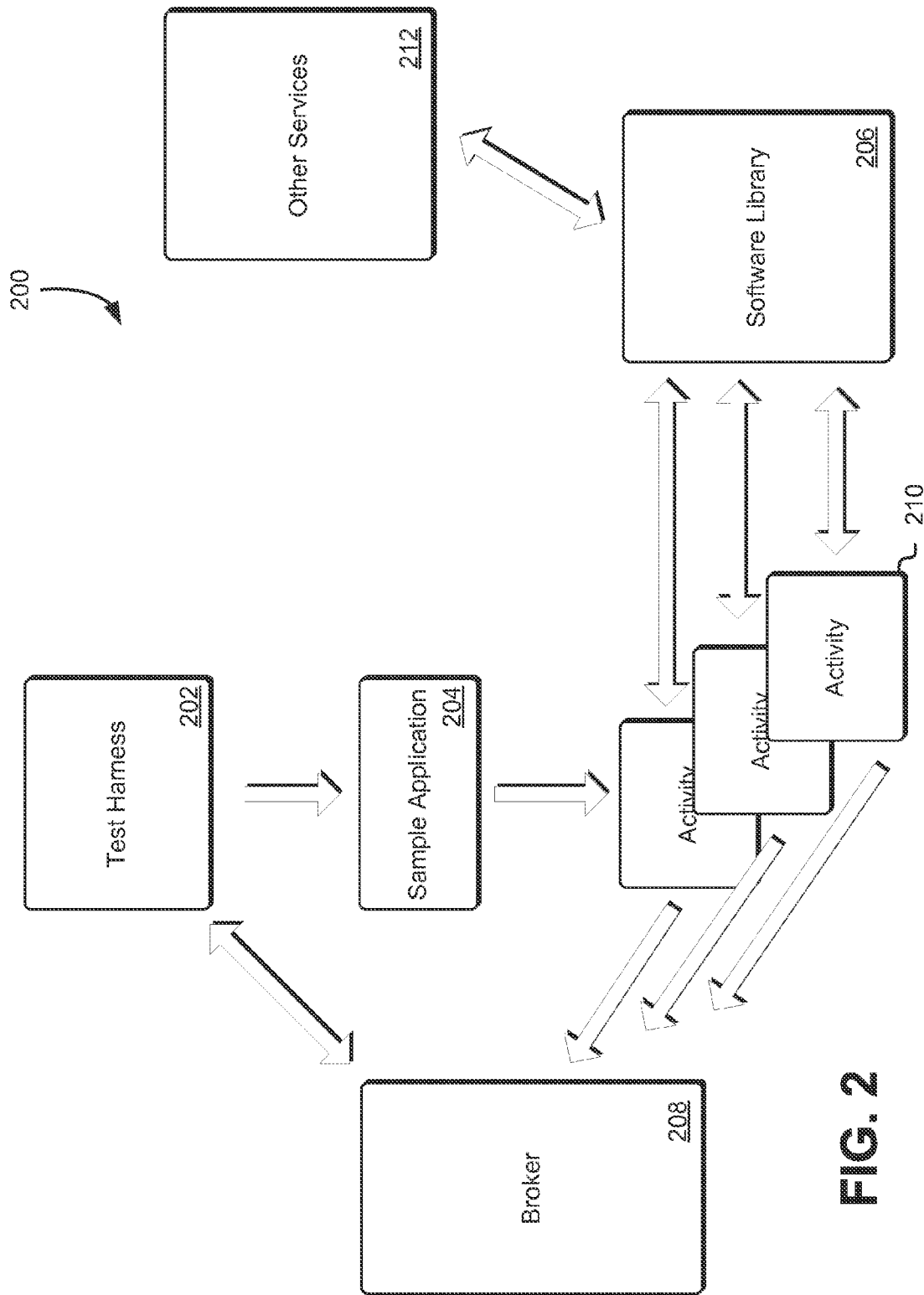
FIG. 2 shows an example of a testing framework for non-UI elements in accordance with at least one embodiment.

FIG. 2 illustrates an example environment 200 where one or more computer systems, as well as the associated code running thereon, may execute a test automation framework utilizing inter-process communications to communicate between various applications involved in the testing framework. A test harness 202 may be responsible for automating the execution of various tests and managing testing information. Furthermore, the test harness 202 may be exposed to a customer as a service for test automation to be described in greater detail below in connection with FIG. 4. The test harness 202 may receive test data (also referred to as test information) corresponding to one or more tests to be executed in order to test software or other executable code. For example, a user may define one or more library calls and parameters to be tested by the test harness 202. The test harness 202 may transmit or otherwise cause to be executed by the sample application 204, the one or more library calls defined by the user.

The sample application 204 may execute an activity 210 for each library call received from the test harness 202. In various embodiments, the test harness 202 causes the activities 210 to be executed within the process boundary of the sample application 204 without communicating with the sample application 204 directly. The activities 210 may be executed by one or more processors of a test system executing the sample application 204. For example, the test system may be a computer system executing a mobile device emulator, the mobile device emulator may provide a virtual central processing unit (CPU) to any applications executed by the emulator such as the sample application 204. The sample application 204 may execute the activities 210 corresponding to the library calls indicated by the user. The activities 210 may be executed by the virtual CPU of the emulator. The activities 210 may be processes or threads of the sample application 204 configured to execute a library call or other portion of executable code and return a result to the test harness 202 through the broker 208.

The test harness 202 may register with the broker 208 method in order to receive a response from the activities 210. For example, the test harness 202 may record information corresponding to the test operations to be executed by the sample application 204 and information to be returned to the test harness 202 in an entry of data structure. The test harness 202 may then transmit a command to the sample application 204 indicating the test operations and the entry in the data structure. The activities 210 of the sample application 204 may then execute the test operations and determine, based at least in part on the entry in the data structure, a location to transmit the results. The location may include an application such as the test harness, a memory address, a network location, a message routing service or device, a communications channel or other information suitable for transmitting test results. As illustrated in FIG. 2, the activities 210 may transmit the results of the test operations to the test harness 202 through the broker 208.

Furthermore, the activities 210 may execute a library call of a software library 206. The software library 206 may be a collection of implementations of behavior, written in terms of a language that has an interface by which particular behaviors may be invoked. The software library 206 may include executable code that may be invoked by one or more library calls, the library calls may include parameters further defining the execution of the library call. For example, the software library 206 may define a library call to create a user account and the parameters included in the library call may include customer name, customer e-mail address, customer telephone number and a password. The software library 206 may cause data to be transmitted and/or received from one or more other services 212. Returning to the example above, the created user account library call may transmit information passed as a parameter to the library call to an account creation service that may return an indication that the account was successfully created.

The software library 206 may return an indication of whether a particular library call was executed successfully to the activity 210 after the completion of the library call. The indication may include information received from the other services 212. The activities 210 may receive the indication for the software library 206 and forward the indication to the test harness 202 through the broker 208. The test harness 202 may validate the test results and generate a test report, based at least in part on the indication received from the activities 210. The test harness 202 may validate the test results by determining, based at least in part on the indication, whether the activities 210 executed the library calls completely, passed the correct parameters and other data to the library calls, received a response to the library calls or otherwise completed the test operations transmitted by the test harness 202.

The test harness 202 may also monitor the execution of the sample application 204 and the activities 210. The test harness 202 may periodically or a periodically transmit a request to the sample application 204 and/or activities 210, the request may be configured such that the sample application 204 and/or the activities 210 return in response to the request status information. For example, the test harness 202 may transmit a request to the sample application 204 to determine if the sample application 204 is still operational and an error in the execution of the sample application 204 has not occurred. Furthermore, the test harness 202 may also register a heartbeat request in the intent data structure and cause an activity 210, associated with the heartbeat request, to be launched by the sample application. The activity 210 associated with the heartbeat request may transmit information corresponding to the operation state of the sample application 204 and/or other activities 210 to the test harness. The test harness 202 may determine the state of test operation transmitted to the sample application 204 for execution.

Figure 3:
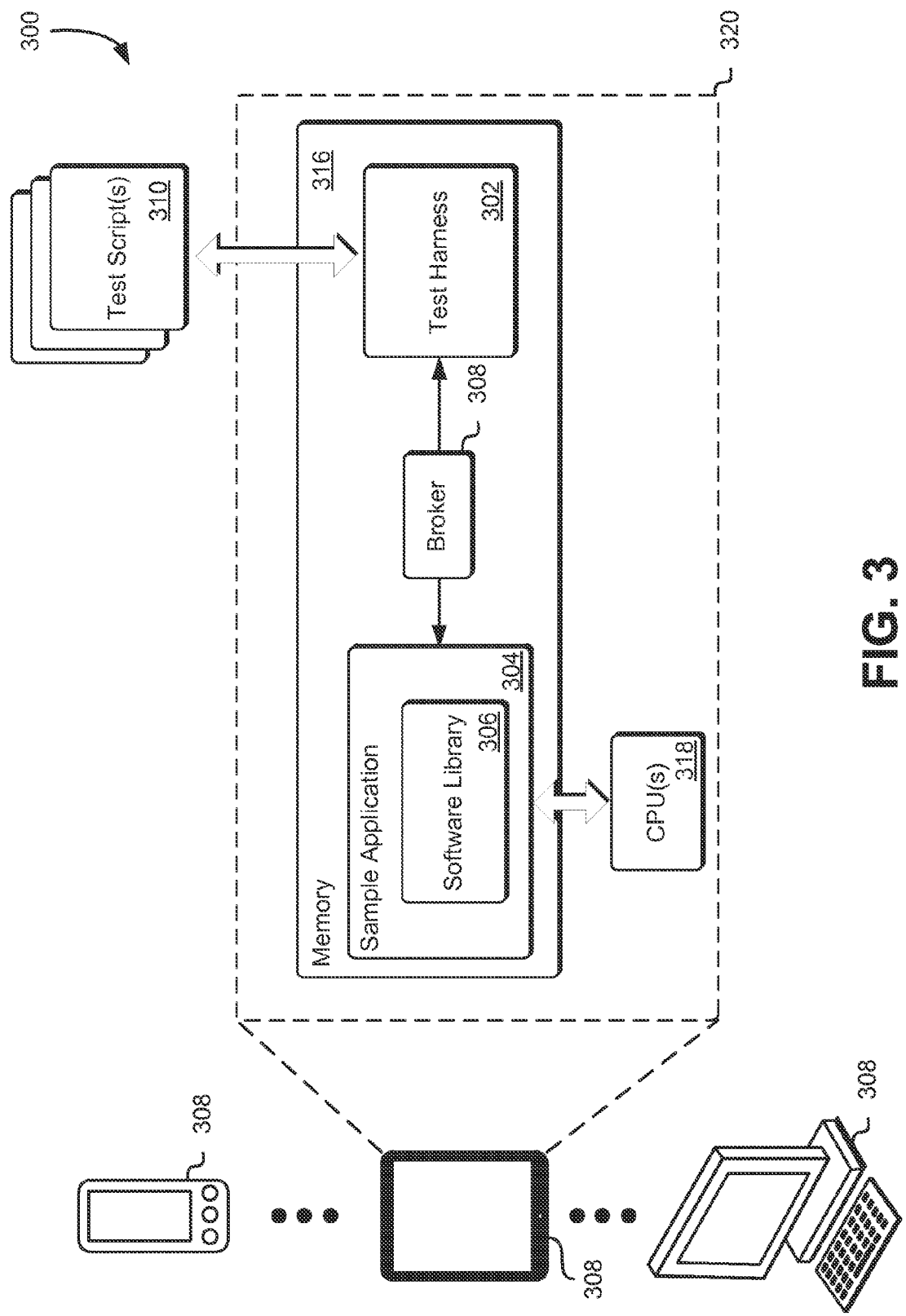
FIG. 3 shows an example of various devices executing a testing framework for non-UI elements in accordance with at least one embodiment.

FIG. 3 illustrates an example environment 300 where one or more testing devices 308, as well as the associated code running thereon, may execute a test automation framework utilizing inter-process communications to communicate to a sample application involved in the execution of various tests. The testing devices may be any suitable computer systems, virtual computer system, mobile device, virtual device or combination thereof capable of executing the test harness 302, sample application 304 and software library 306. A test harness 302 may be loaded into memory 316 of a testing device 308 using a variety of different techniques. For example, the test harness 302 may be transmitted to the testing device 308 over a network connection and loaded into memory by a network interface of the testing device 308 responsible for receiving the test harness 302 over the network connection. The test harness 302 may include executable instructions that, when executed by one or more processors 318 (also referred to as CPUs or central processing units) of the testing devices 308, cause the testing devices 308 to perform various operations associated with testing of a software library 306, other software stored in memory 316 or other hardware of the testing devices 308. In various embodiments, the testing devices 308 execute the test automation framework in a virtualization layer or other hardware abstraction layer.

As shown in FIG. 3, the testing device 308 includes at least a memory 316 and one or more processors 318. The testing device 308 may include one or more processors of a variety of different processors, such as CPUs or graphics processing units (GPUs), that provides computing functionality to the testing device. Examples of processors include those utilizing a complex instruction set computing (CISC) architecture, such as the x86 CPU, and others that utilize a reduced instruction set computing (RISC) architecture, such as the advanced RISC machine (ARM) CPU. The testing device 308 may include additional hardware not illustrated in FIG. 3 for simplicity. The data stored in the memory 310 (programs, code modules, instructions) that, when executed by one or more processors 318, may provide the functionality of one or more embodiments of the present disclosure. These application modules or instructions may be executed by the one or more processors 302. The memory 310 may additionally provide storage for testing results and other software of the testing device 308 such as an operating system. The memory 310 may include a hard disk, random access memory, read only memory, network attached storage, static memory, dynamic memory or any other storage mechanism suitable for storing executable code. The testing devices may further include a network interface configured to communicate using any type of communication protocol including a cellular wireless communications protocol, such as fourth generation (4G) communications or long term evolution (LTE®), a wireless local area network (WLAN) communications protocol, such as an Institute for Electrical and Electronics Engineers (IEEE) 802.11, 802.16 or 802.21 communication protocol, or short range communications protocol, among others.

One or more test scripts 310 may be obtained by the test harness 302, the test scripts 310 may provide instructions for executing one or more tests. The test scripts 310 may be generated by a user or test administrator. Furthermore, the test scripts may be pre-generated and stored for use with the test harness 302 or may be generated contemporaneously with the execution of the test harness. For example, a user may logon to a test service webpage implemented as a single-page application (SPA) and enter information corresponding to one or more tests to be performed on a specific software library. The SPA may then generate one or more test scripts configured to cause the test harness 302 to execute the one or more tests indicated by the user and store the generated one or more test scripts 310 for use at some point later in time. In another example, the test harness may provide a user interface enabling a user, through an input device connected to the testing device 308, to enter one or more tests to be performed on a particular software library. The test harness 302 may receive the input from the user and generate the corresponding test scripts 310 in order to perform the test indicated by the user.

Once the test harness 302 obtains the test scripts 310, the test harness 302 may translate or otherwise convert the test scripts 310 into commands or other operations executable by the sample application 304 and/or associated processes of the sample application 304. In various embodiments, the test scripts 310 contain commands executable by the sample application 304, that when executed by the sample application 304 cause one or more tests to be executed and the test harness 302 then forwards the test scripts 310 or a portion thereof to the sample application 304 over an inter-process communication channel. The test scripts 310 may include the library calls and the parameters, if any, to pass with the library calls. The test harness 302 may obtain information from the test scripts 310 corresponding to the library call and parameters. For example, the test harness 302 may parse the test scripts 310 in order to extract the information useable to cause the sample application to execute the one or more tests.

Based at least in part on the information obtained from the test scripts 310, the test harness 302 may generate test commands configured to cause the sample application 304 to execute the tests indicated by the test scripts 310. For example, the test harness 302 may cause a process of the sample application 304 to be instantiated, the process may be configured to execute a particular library call indicated in the test scripts. The process may then execute as a process of the sample application, thereby enabling the process to access the software library 306 contained in the sample application. In various embodiments, the software library 306 is accessible by the sample application 304 and processes thereof but is not contained in the sample application 304. Once the sample application 304 or processes thereof have completed the library calls indicated by the test harness 302, the sample application 304 may transmit the results of the library calls to the test harness through the broker 408. The test harness 302 may then validate the results and generate a report based at least in part on the validated results. The broker 308 may enable data to be written to a secure digital (SD) card connected to the testing device 308.

The sample application 304 or process thereof may then record information to the SD card connected to the test device 308 through the broker 308. The test harness 302 may then be configured to obtain information from the SD card such that the sample application 304 and the test harness may communicate. In another example, the broker 308 may emulate one or more storage mechanisms in order to enable communication between the sample application 304 and the test harness 302. The broker 308 may emulate a storage device and enable the sample application 304 to record information to the storage device, the recorded information may be transmitted over a network to a remote storage device. The test harness 302 may then obtain the recorded information from the broker 408.

Figure 4:
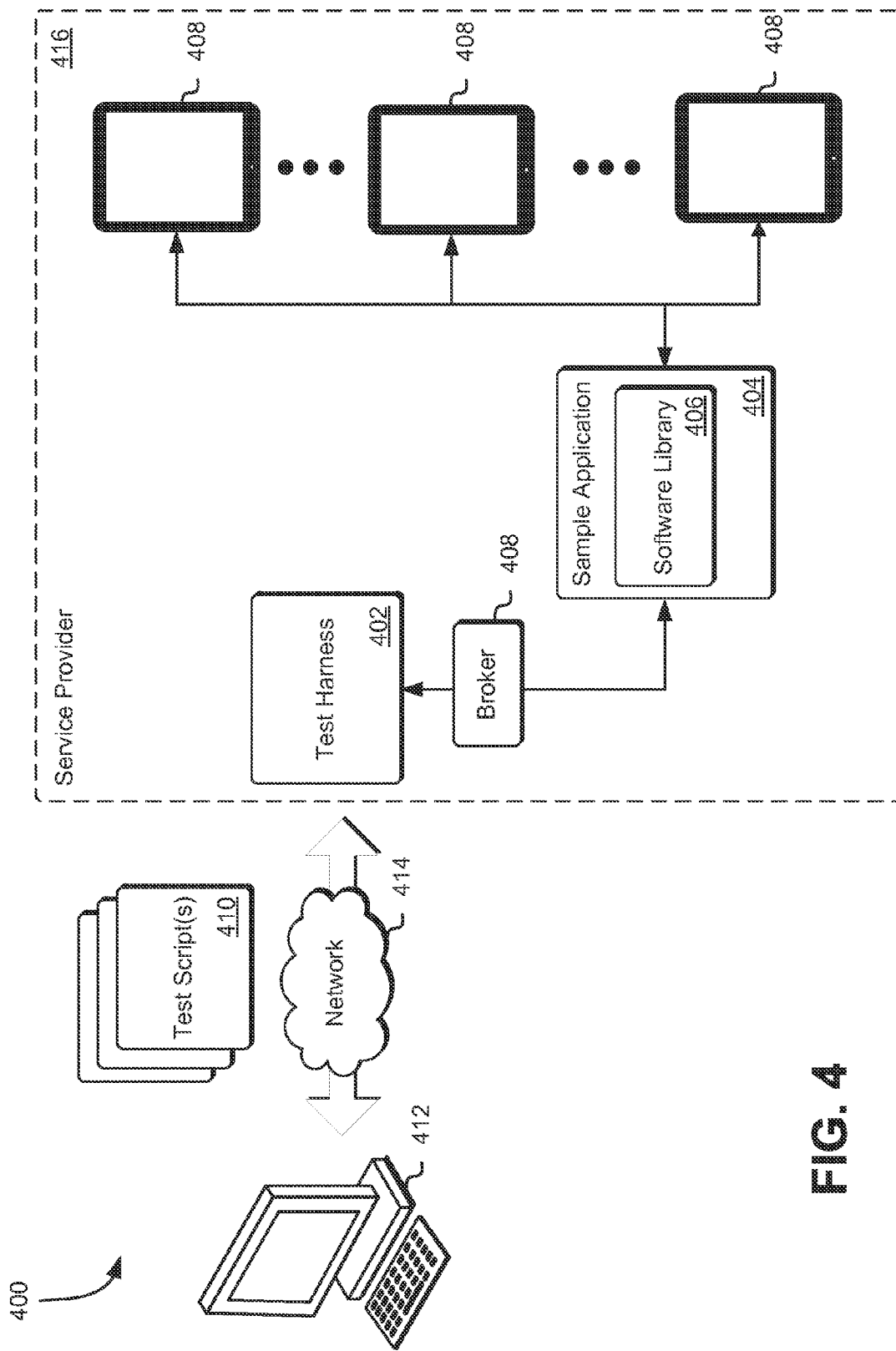
FIG. 4 shows an example of executing a testing framework for non-UI elements as a service in accordance with at least one embodiment.

FIG. 4 illustrates an example environment 400 where a customer 412 may connect to a computing resource service provider (also referred to simply as a service provider 416) in order to test a software library 406 on various different computing devices 408. The various different computing devices 408 may have different hardware profiles. The hardware profile may indicate particular hardware and combinations of hardware contained in the computing devices 408. For example, the hardware profiles may indicate the particular CPU and memory of a particular computing device 408. Furthermore, the hardware profiles may indicate differences between hardware contained in different versions or models of the computing device 408. The service provider 416 may provide a variety of services to the customer 412, and the customer 412 may communicate with the service provider 416 via an interface (not shown in FIG. 3 for simplicity), which may be a web services interface or any other type of customer interface. In various embodiments, the interface is configured as part of the test harness 402. The customer 412 may be an organization that may utilize one or more of the services provided by the service provider 416 to maintain and test software developed by employees of the organization, which may be located in various geographical locations. Additionally, the customer 412 may be an individual that utilizes the services of the computing resource service provider to test software developed by the customer 412 or by others. As shown in FIG. 3, the customer 412 may communicate with the service provider 416 through a network 414, whereby the network 414 may be a communication network, such the Internet, an intranet or an Internet service provider (ISP) network. Some communications from the customer 412 to the computing resource service provider 416 may cause the service provider 416 to operate in accordance with one or more embodiments described herein or a variation thereof.

For example, the customer 412 may transmit one or more test scripts 410 to the service provider 416. The test scripts may indicate library calls or other test operations to be performed by the service provider 416 and/or computer systems or service of the service provider 416. Furthermore, the test scripts 410 may include information corresponding to the results of the test, such as a location for the results to be transmitted or a format for the results to be in. The test scripts 310 may be generated by the customer 412 on a computing device operated by the customer, or the test scripts may be generated by the test harness 402 based at least in part on input generated by the customer 412 operating the computing device and transmitted over a network 414 to the test harness 402. The test harness, as illustrated in FIG. 4, may be configured as a service of the service provider 416. The test harness 402 may determine one or more test operations to be executed by the sample application 404. The one or more test operations may correspond to software library 406 calls indicated by the customer 412 in the test scripts 410.

The test scripts 410 may also indicate particular aspects of the computing devices 408 to be used to execute the various tests indicated in the test scripts 410. For example, the customer 412 may indicate in the test scripts 410 particular hardware, versions of hardware, operating systems, virtualized hardware, additional software, model numbers, computing capacity, memory capacity or any other suitable feature for differentiating computer systems or any combination thereof on which to execute the tests. The test harness 402 or other service of the service provider 416 may determine one or more computing systems 408 on which to execute the tests. The test harness 402 may then cause the sample application 404 to be loaded into memory of the computing devices 408 included in the test. The test harness 402 or a copy of the test harness 402 may also be loaded in the memory of the computing device 408. In various embodiments, the test harness 402 and sample application 404 are loaded into memory of one or more computer systems of the service provider 416 and accessible by the computing devices 408 such that the executable code associated with the test harness 402 and the sample application 404 may be executed by one or more processors of the computing device 408.

A single instance of the test harness 402 and the sample application 404 may be responsible for executing one or more software tests on multiple computing devices 408 or multiple instances of the test harness 402, and the sample application 404 may be responsible for executing the one or more software tests on one or more computing devices 408. The software tests may be executed sequentially or in parallel. In order to execute the software tests, the test harness 402 may transmit commands to the sample application 404. The commands may be transmitted using one or more inter-process communication methods, such as those described above. Furthermore, the commands from the test harness 402 may be transmitted to the sample application 404 over a network regardless of the communication method used. The commands may indicate one or more library calls, the library calls may correspond to information included in the test scripts 410. For example, the test scripts 410 may indicate that a storage function of the software library 406 is to be tested. The test harness 402 may determine that multiple library calls are required in order to test the storage function of the software library 406 and may transmit multiple commands corresponding to the library calls to the sample application 404 in order to perform the test indicated in the test scripts 410. Before or contemporaneously with transmitting the commands to the sample application 404, the test harness 402 may register an intent associated with the commands. The intent may indicate test information to return to the test harness 402 after completion of the transmitted commands.

The sample application 404 may make the library calls indicated by the test harness 402 and may transmit the results to the test harness 402 based at least in part on the intent registered by the test harness 402. The library calls may cause the testing device 408 to perform various operations and return information corresponding to the operations to the sample application 404. The test harness 402 may receive the results from the sample application 404 and may validate the results. The test harness 402 may validate the results by at least determining that the library calls corresponding to the results are the library calls indicated in the commands transmitted to the sample application 404. After validating the results, the test harness 402 may transmit the results to the customer 412 or otherwise make the results available to the customer. For example, the test harness 402 may cause the results to be saved by the service provider 416 until such time that the customer 412 requests the results from the service provider 416. Furthermore, the test harness 402 may format the results and cause the results to be displayed to the customer. For example, the test harness 402 or other service of the service provider may generate a webpage configured to display the results and transmit the webpage over the network 414 to the computer system of the customer 412.

Figure 5:
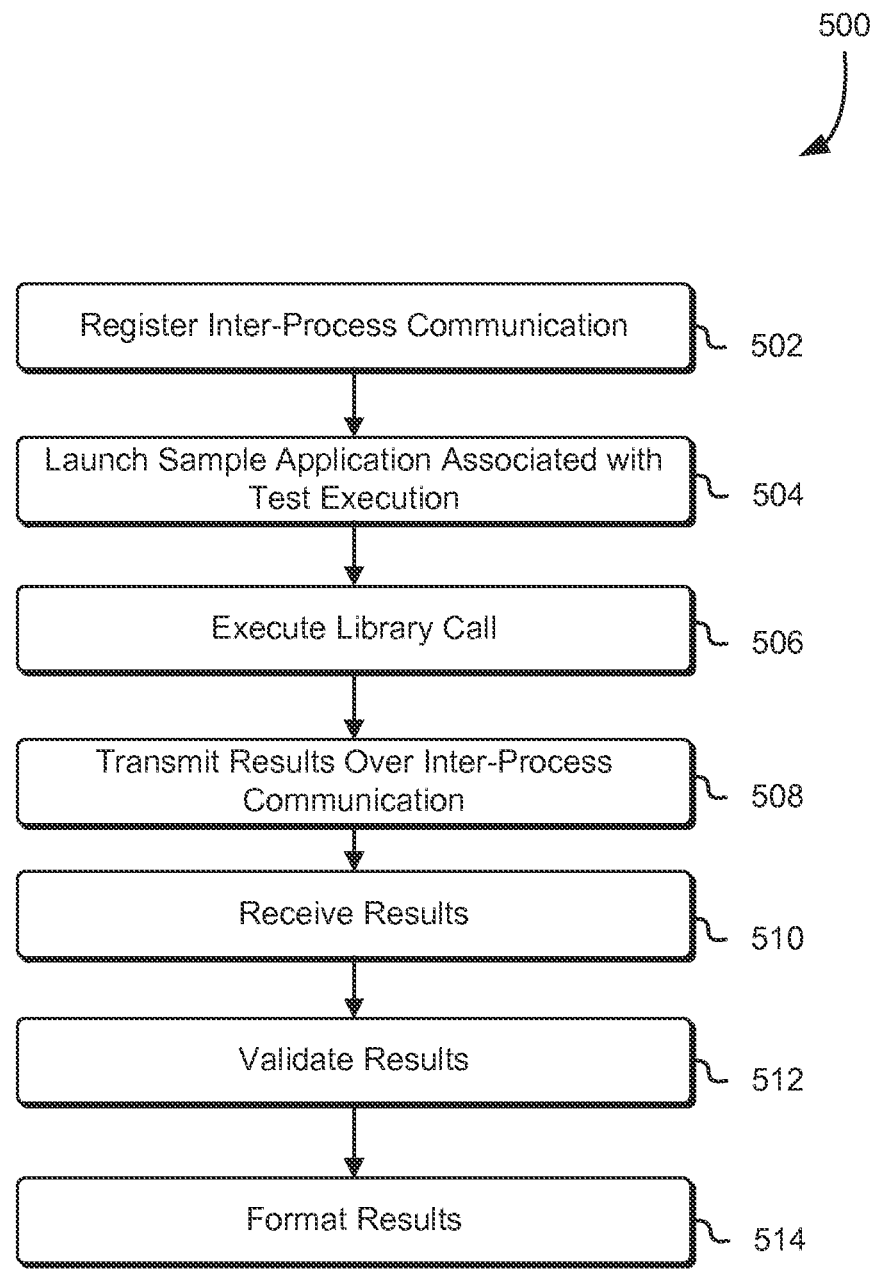
FIG. 5 shows an illustrative example of a process for executing a testing framework for non-UI elements in accordance with at least one embodiment.

FIG. 5 shows an illustrative example of the process 500 which may be used to test one or more non-UI elements included in a software library. The process 500 may be performed by any suitable system such as the testing system executing the test harness and sample application described above in connection with FIG. 2. Returning to FIG. 5, in an embodiment, the process 500 includes registering an inter-process communication 502 channel. For example, the test harness may register an intent in a data structure, the intent may provide for receiving a broadcast message at a broadcast receiver (e.g., the test harness). The data structure may be maintained by the operating system executing on the computing device executing the one or more tests of non-UI elements of the software library. Once the test harness has established a mechanism for receiving the results of the one or more tests, the test harness or other computer system may launch the sample application associated with the one or more tests 504. The sample application may be the application under test, or the sample application may wrap the software library such that the library calls included in the tests may be executed by the testing device. For example, the test harness may, through the operating system of the testing device, cause the sample application to be launched.

The sample application, once launched, may execute one or more library calls 506. The particular library calls may be indicated by the test harness as described above in connection with FIG. 1. Furthermore, the test harness may cause activities to be launched within the process boundary of the sample application (e.g., the activities may be processes of the sample application). The activities may receive information corresponding to a particular library call from the test harness and may execute the library call based at least in part on the received information. Once the library call is executed, the results of the library call may be returned to the test harness or some other computer system. The results may be transmitted using an inter-process communication 508 channel. For example, the test harness may register as a receiver of a broadcast message and transmit the registration to the activities and/or sample application along with the library calls such that the activities and/or the sample application return the results of the library call to the test harness based at least in part on the registration.

The test harness may receive the results 510. The test harness may wait for the results to be returned from the sample application. Furthermore, the test harness may receive updates from the sample application indicating that the sample application and activities thereof are still operational. The test harness may then validate the test results 512. The test harness may validate the results in order to determine information about the executed test including accuracy, precision, repeatability, reproducibility, limits of error detection, computer system suitability, hardware compatibility or any other information detectable from the test results. The test harness may then format the results 514 such that the information in the results is configured to be easily readable by a human operator. For example, the test harness may parse the test results and cause the results to be displayed such that error codes are shown in red text.

Figure 6:
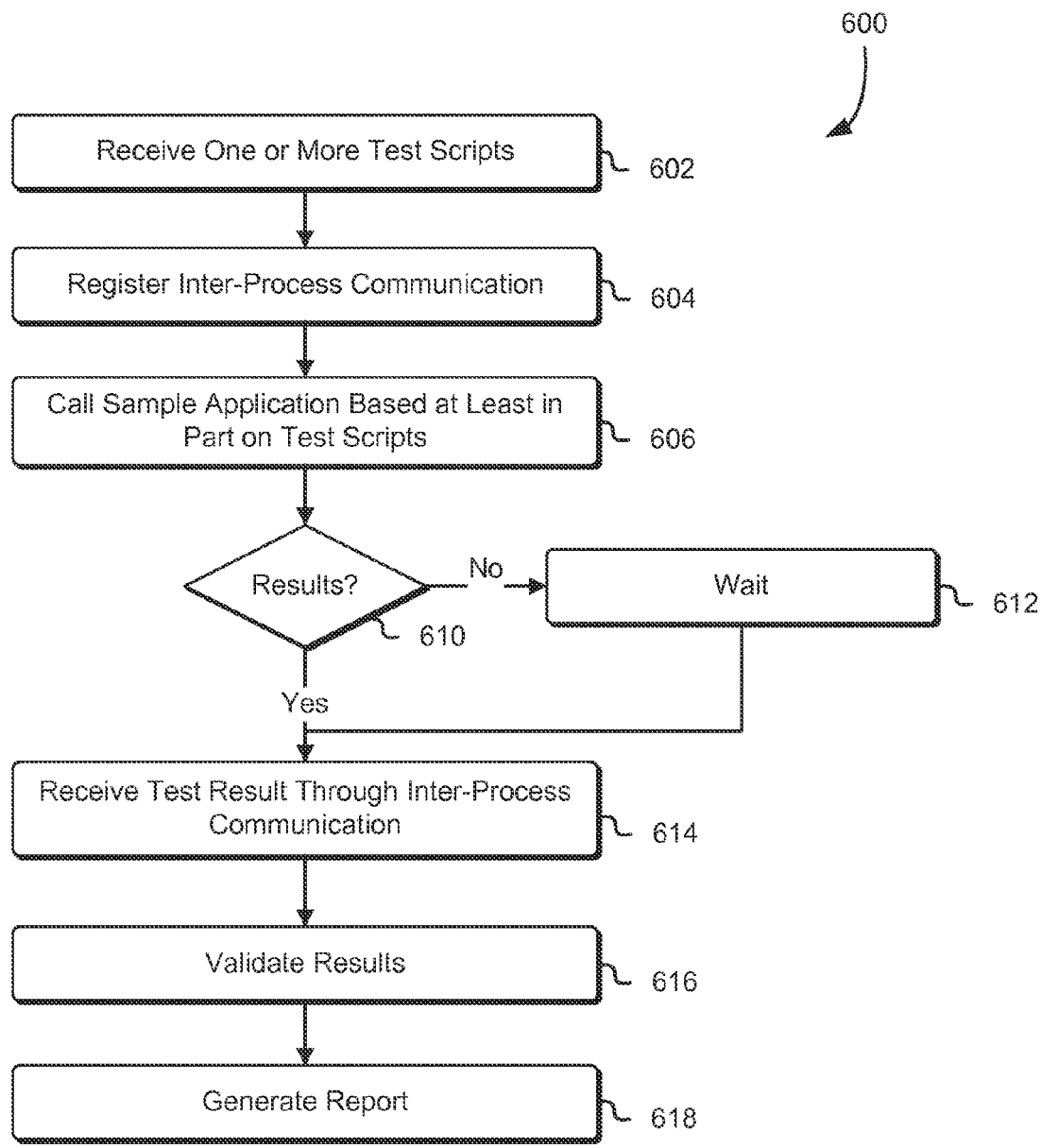
FIG. 6 shows an illustrative example of a process for executing a test harness for non-UI elements in accordance with at least one embodiment.

FIG. 6 shows an illustrative example of the process 600 which may be used to test one or more non-UI elements included in a software library. The process 600 may be performed by any suitable system such as the testing system executing the test harness described above in connection with FIG. 3. Returning to FIG. 6, in an embodiment, the process 600 includes receiving one or more test scripts 602. The test scripts may be generated based at least in part on an operation performed by a human operator as described above in connection with FIG. 4. The test scripts may include information corresponding to the test that the test harness is to execute. For example, the test script may include several API calls included in a software library to be tested. The test harness may then register an inter-process communication 604 channel. For example, the test harness may register as a broadcast receiver, the test harness may register the information in a data structure maintained by the operating system of the testing device. The data structure may enable an application to exchange a message during operation. Registering the inter-process communication channel may enable the test harness to receive the results of the test.

Once the test harness has registered the inter-process communication channel, the test harness may call the sample application based at least in part on the test scripts 606. For example, the test harness may transmit to the sample application the library calls indicated in the test scripts. The test harness may transmit the library call through an inter-process communication channel. For example, the test harness may initiate an activity on the sample application and pass the library call as a parameter to the function call responsible for initiating the activity on the sample application. The test harness may also pass information corresponding to the registered inter-process communication channel in order to receive the results of the library call. The test harness may then determine if the results 610 of the library call have been received. If the results have not been received, the test harness may wait 612 for the results to be received. In various embodiments, the test harness transmits a request to the sample application to determine if the results have been received. The sample application may also be configured to transmit information indicating to the test harness whether the sample application has received the results. If the sample application or component thereof has received the results, the results may be transmitted through the inter-process communication channel to the test harness 614. The sample application may obtain information from the data structure in order to transmit the results to the test harness.

Once the results have been received, the test harness may then validate the test results 616. The test harness may validate the results in order to determine information about the executed test, whether the correct tests were performed, whether the tests were completed entirely and other information corresponding to the executing of the tests. The test harness may then format the results such that the information in the results are configured to be easily readable by a human operator. For example, the test harness may parse the test results and cause the results to be displayed such that error codes are shown in red text. Furthermore, the test harness may generate a report 618 based at least in part on the results. The report may include information corresponding to the results of the test and the operation of the software library. For example, the report may be a webpage configured to indicate API calls of the software library that function correctly, as well as API calls that do not function correctly.

Figure 7:
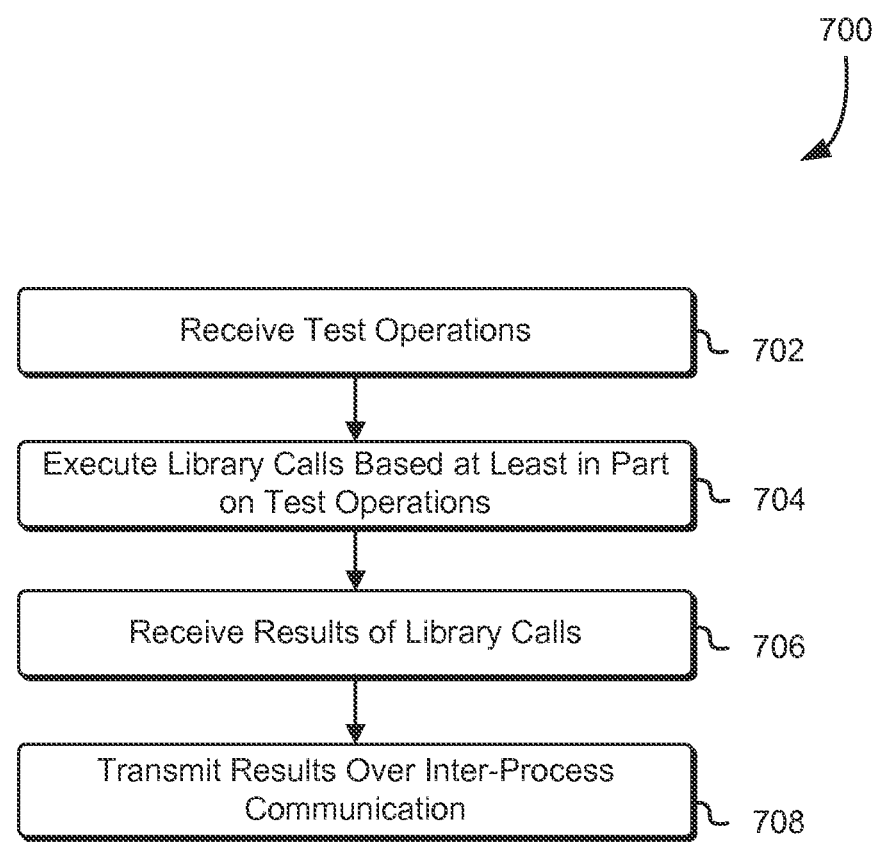
FIG. 7 shows an illustrative example of a process for executing a sample application for testing framework for non-UI elements in accordance with at least one embodiment.

FIG. 7 shows an illustrative example of the process 700 which may be used to test one or more non-UI elements included in a software library. The process 700 may be performed by any suitable system such as the sample application described above in connection with FIG. 1. Returning to FIG. 7, in an embodiment, the process 700 includes receiving test operations 702. The test operations may be library calls received from the test harness. The test operations may also include executable code or software modules. The test operations may be parsed or otherwise obtained from a test script generated by a user. The sample application or other computer system may then cause one or more library calls to be executed based at least in part on the test operations 704. The one or more library calls may be executed in parallel or sequentially. Furthermore, the library call may invoke the executing of other library calls on the testing device or other computer systems. For example, a library call may cause the testing device to transmit a request from a webpage to a server over a network and receive a response to the request.

After the library call has been executed by the sample application, the results of the library call may be received 706. For example, if a library call fails, the sample application may receive an error code or fault. However, if the library call is executed correctly, the sample application may receive data from the software library. The results from the library call may be transmitted to the test harness over an inter-process communication 708 channel. For example, the sample application may receive a register intent with the test operations, upon receiving the results the sample application may retrieve information from a data structure based on the registered intent. The information may indicate to which test harness to transmit the results.

Figure 8:
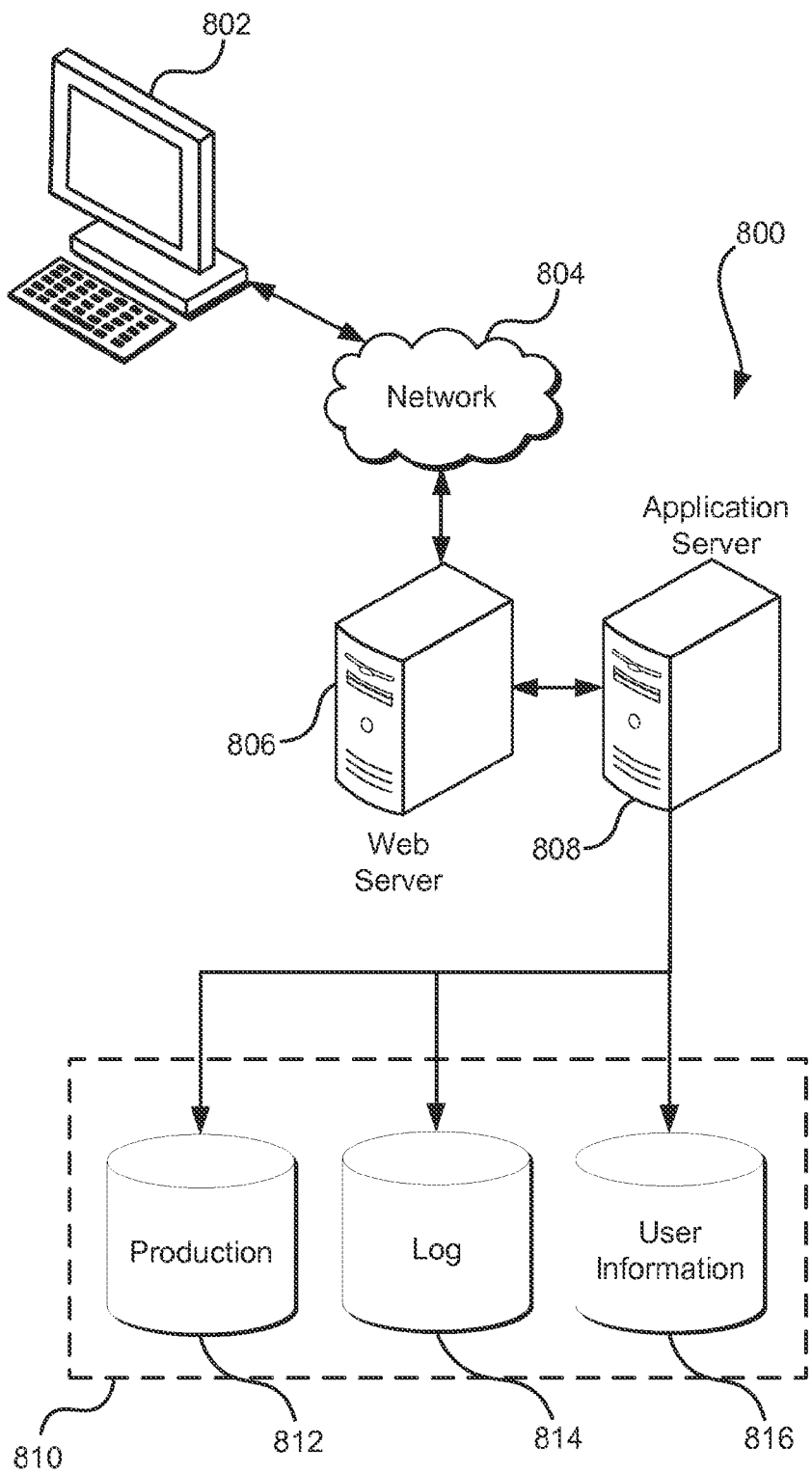
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for testing applications, comprising:
    obtaining information specifying one or more test operations indicating library calls and parameters to include in the library calls in order to execute an application test, the one or more test operations indicated by one or more input devices of a computing device of a user;

instantiating a test harness responsible for managing the execution of the application test, the test harness isolated from a sample application such that the sample application is unable to communicate directly to the test harness;

launching one or more activities by the test harness, the one or more activities being executed by the sample application and the one or more activities causing execution of at least a subset of the one or more test operations including the indicated library call;

executing the library calls associated with the one or more test operations and obtaining, by the one or more activities, a result of the execution of the library calls;

transmitting, over an inter-process communication, the result to the test harness, the inter-process communication including a broadcast channel provided by an operating system and a receiver registered with the operating system by the test harness to receive communications over the broadcast channel, where the broadcast channel provides access to the result stored in application memory of the test harness as a result of the receiver being registered with the operating system by the test harness; and validating the result based at least in part on the one or more test operations.

2. The computer-implemented method of claim 1, wherein the computer-implemented method further includes initiating a time-out period contemporaneously with launching the one or more activities, the time-out period configured such that at termination of the time-out period, if the test harness has not received the result, the test harness determines at least a subset of the one or more test operations that have failed.

3. The computer-implemented method of claim 1, wherein executing library calls further includes transmitting a request to a remote service and receiving a response to the request.

4. A system, comprising:
at least one computing device that implements one or more services, wherein the one or more services cause the system to:
load into a memory of the at least one computing device an automated testing framework, a sample application, and at least one portion of executable code under test such that the automated testing framework and the sample application are isolated by an operating system of the at least one computing device such that the sample application lacks an interface synchronously callable by the automated testing framework;

obtain one or more test operations usable for testing the at least one portion of executable code under test, the one or more test operations indicating library calls and parameters to be executed as a result of executing the one or more test operations;

cause the sample application to execute the one or more test operations;

transmit a result of the one or more test operations to the automated testing framework over an inter-process communication channel, the inter-process communication channel, provided by an operating system of then system, including a broadcast channel and a receiver registered by the automated testing framework to receive communications over the broadcast channel, where the broadcast channel provides information associated with a memory range including the result based at least in part on the automated testing framework having registered the receiver with the operating system by the automated testing framework; and validate the result based at least in part on the one or more test operations.

5. The system of claim 4, wherein the automated testing framework is loaded into a first memory of a first computing device and the sample application is loaded into second memory of a second device.

6. The system of claim 4, wherein the automated testing framework includes an interface that receives user input from one or more input devices of a computing device of a user, the user input corresponding to the one or more test operations.

7. The system of claim 6, wherein the interface is further causes the system to:
format the result such that information contained is the result may be displayed by an application executing on the computing device of the user; and
transmit the formatted result to the computing device of the user.

8. The system of claim 4, wherein the one or more services are further cause the system to:
load a first copy of the automated testing framework and the sample application in a first computing device of the at least one computing device, the first computing device having a first hardware profile; and
load a second copy of the automated testing framework and the sample application in a second computing device of the at least one computing device, the second computing device having a second hardware profile, wherein the first hardware profile and the second hardware profile are different.

9. The system of claim 4, wherein the at least one portion of executable code under test includes a non-user interface element of a software library.

10. The system of claim 9, wherein the software library is included in the sample application loaded into the memory.

11. A non-transitory computer-readable storage medium having collectively stored thereon executable instructions that, when executed by one or more processors of a computer system, cause the computer system to at least:
receive an indication of a test to perform on executable code, the test including one or more test operations indicating one or more library calls and parameters;

cause a sample application to perform the one or more test operations based at least in part on the received indication, where the sample application is isolated from a test harness such that the sample application is unable to communicate directly to the test harness;

transmit a result of the one or more test operations to the test harness over an inter-process communication channel, the inter-process communication channel includes a broadcast channel that enables the test harness to receive communications, from the sample application, over the broadcast channel by at least registering a broadcast intent by the test harness, where the broadcast channel provides memory information associated with the result based at least in part on the broadcast intent as a result of the broadcast intent being registered with a operating system by the test harness; and validate the result based at least in part on the one or more test operations.

12. The non-transitory computer-readable storage medium of claim 11, wherein the instructions that cause the computer system to perform the one or more test operations further include instructions that cause the computer system to perform the one or more library calls in parallel.

13. The non-transitory computer-readable storage medium of claim 11, wherein the instructions that cause the computer system to receive the indication further include instructions that cause the computer system to receive one or more test scripts corresponding to the one or more library calls.

14. The non-transitory computer-readable storage medium of claim 11, wherein the instructions that cause the computer system to cause the sample application to perform the one or more test operations further include instructions that cause the computer system to execute one or more commands including the parameters by the test harness that cause the sample application to perform the one or more library calls.

15. The non-transitory computer-readable storage medium of claim 11, wherein the instructions further comprise instructions that, when executed by the one or more processors, cause the computer system to register, by the test harness, a receiver that enables the sample application to transmit the result the test harness over the broadcast channel.

16. The non-transitory computer-readable storage medium of claim 11, wherein the instructions further comprise instructions that, when executed by the one or more processors, cause the computer system to format the results by at least parsing the result to obtain information relevant to completion of the one or more library calls.

17. The non-transitory computer-readable storage medium of claim 11, wherein the instructions that cause the computer system to perform the one or more test operations further include instructions that cause the computer system to perform the one or more library calls on one or more elements of a software library that do not have a corresponding user interface element.

18. The computer-implemented method of claim 1, wherein the receiver is executed by the operating system implemented by the computing device.

19. The system of claim 4, wherein the receiver is a component of the operating system implemented by the at least one computing device.

20. The non-transitory computer-readable storage medium of claim 11, wherein the instructions that cause the computer system to perform the one or more test operations further include instructions that cause the computer system to transmit a request to a remote service as a result of executing a library call of the one or more library calls.

* * * * *